July 5, 1949.
D. SCIAKY
2,474,867
PROTECTIVE SYSTEM FOR THREE-PHASE
SINGLE-PHASE MACHINES
Filed Dec. 20, 1945
4 Sheets-Sheet 2
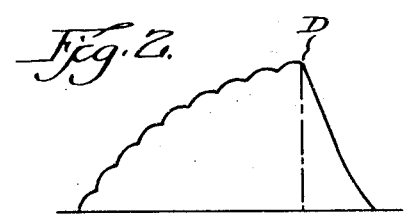
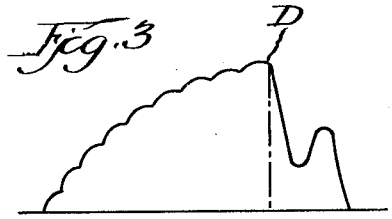
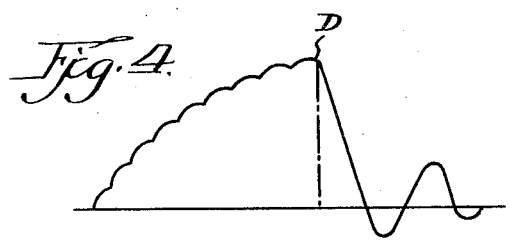
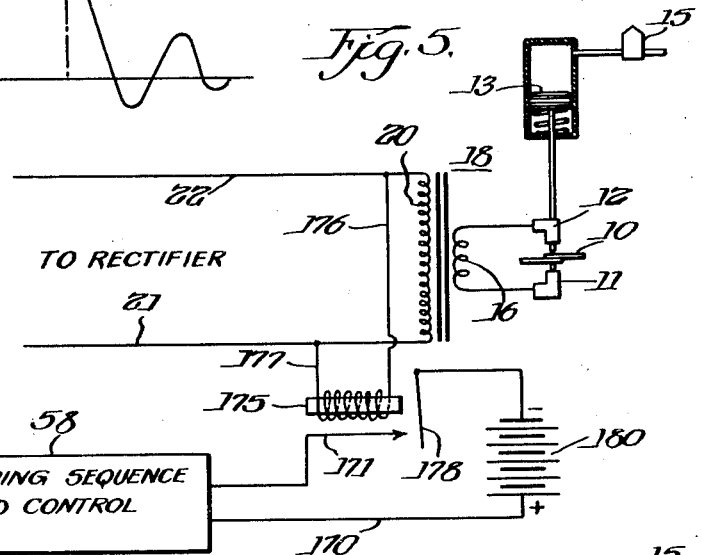
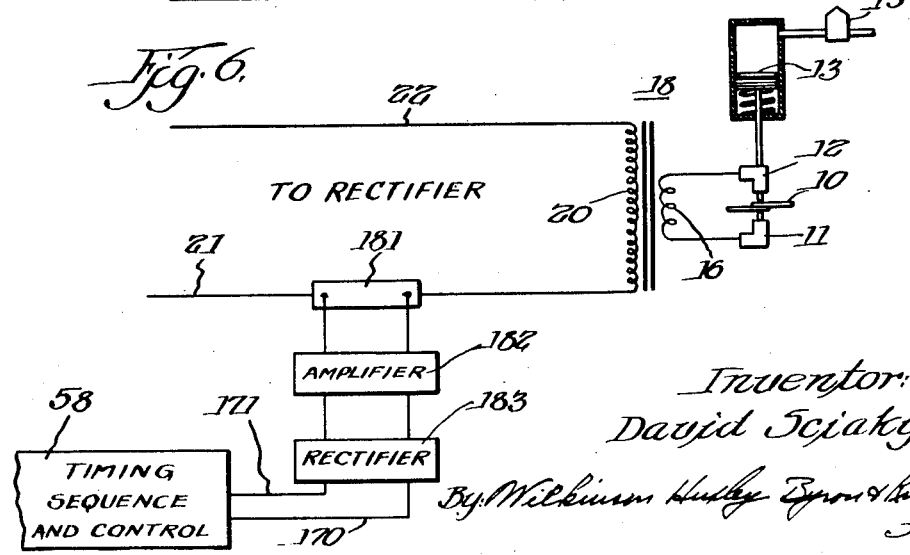
Inventor:
David Sciaky
By Wilkinson Huxley Byron & Knight
Attys.

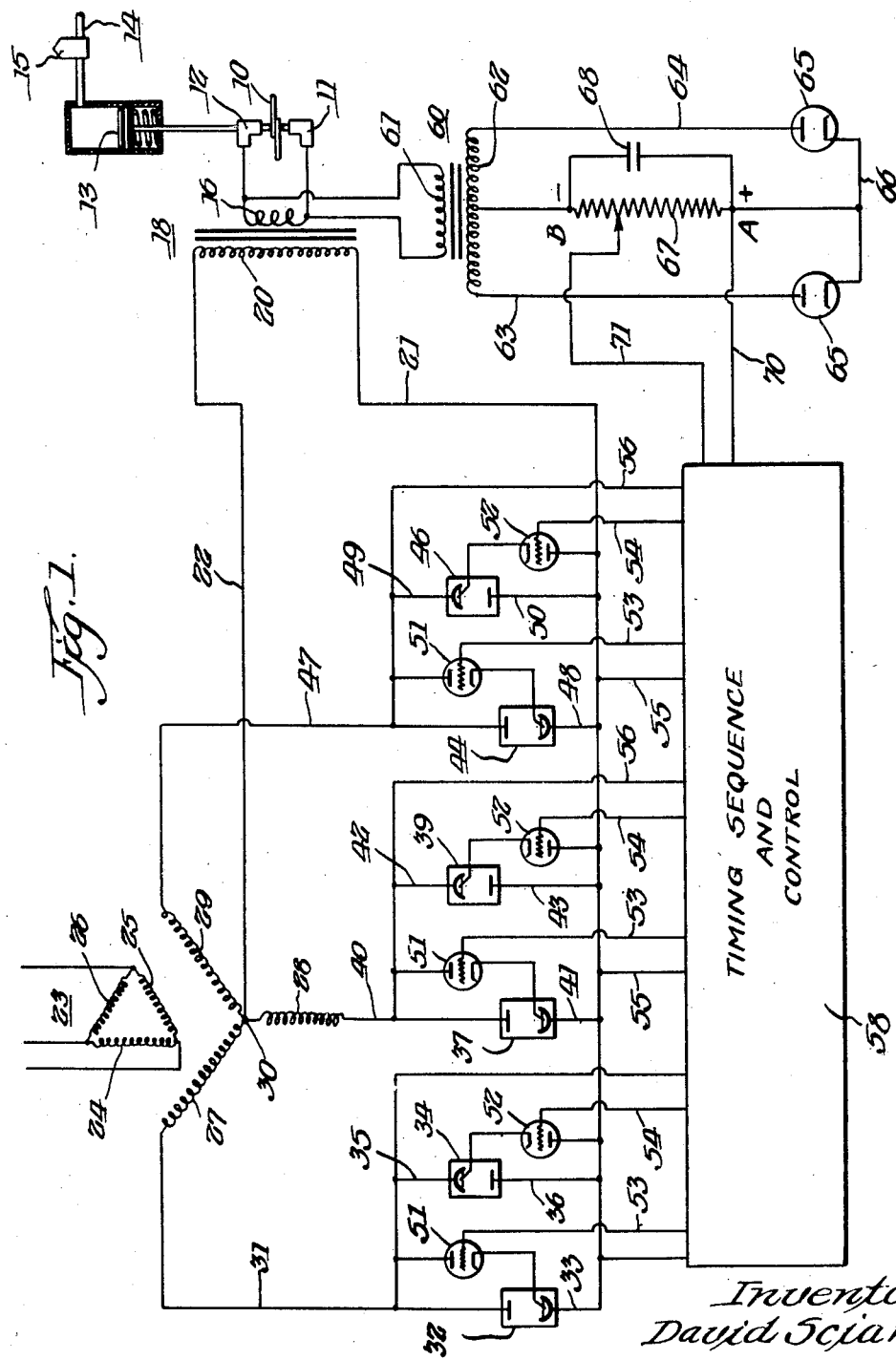

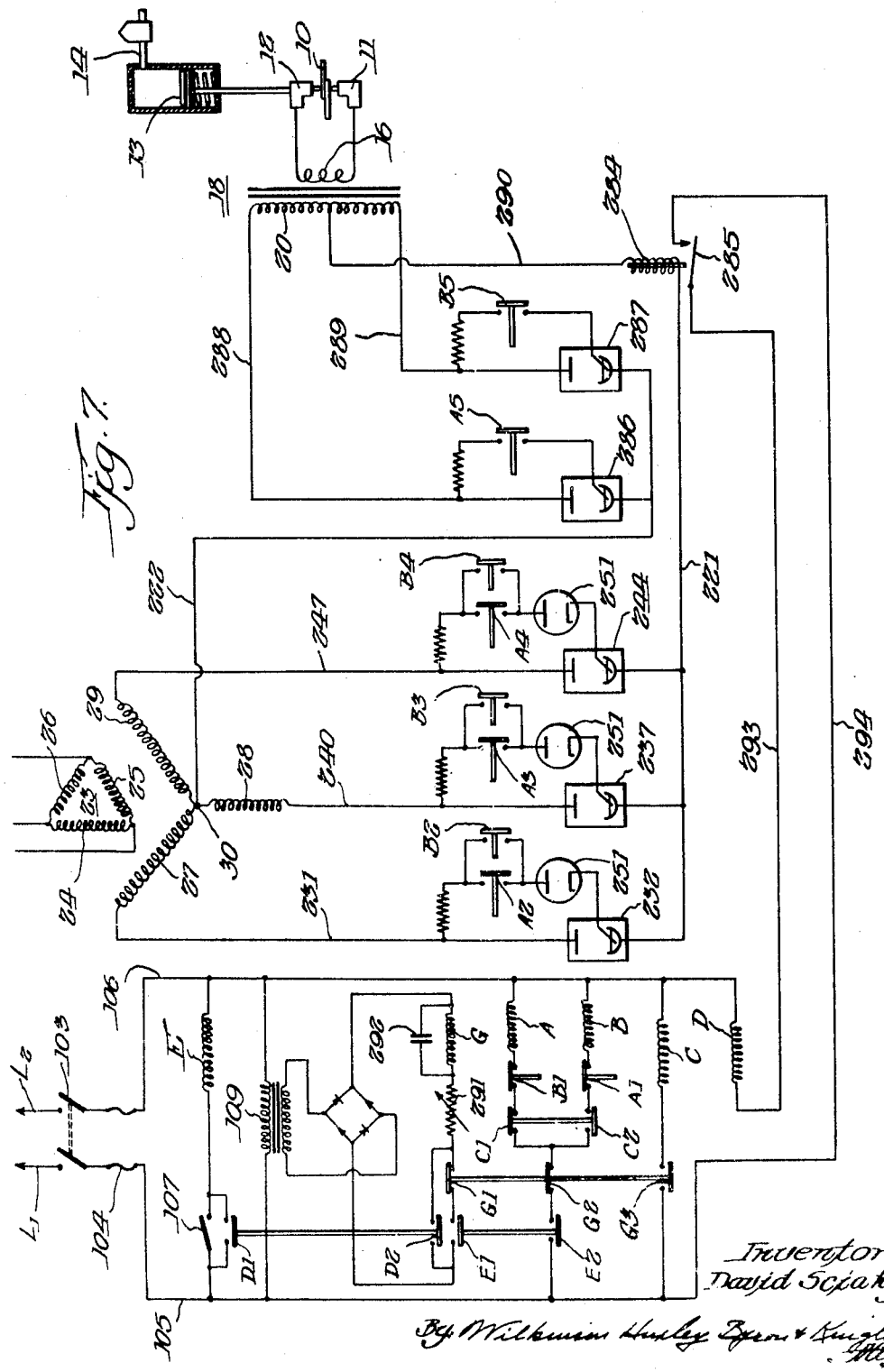

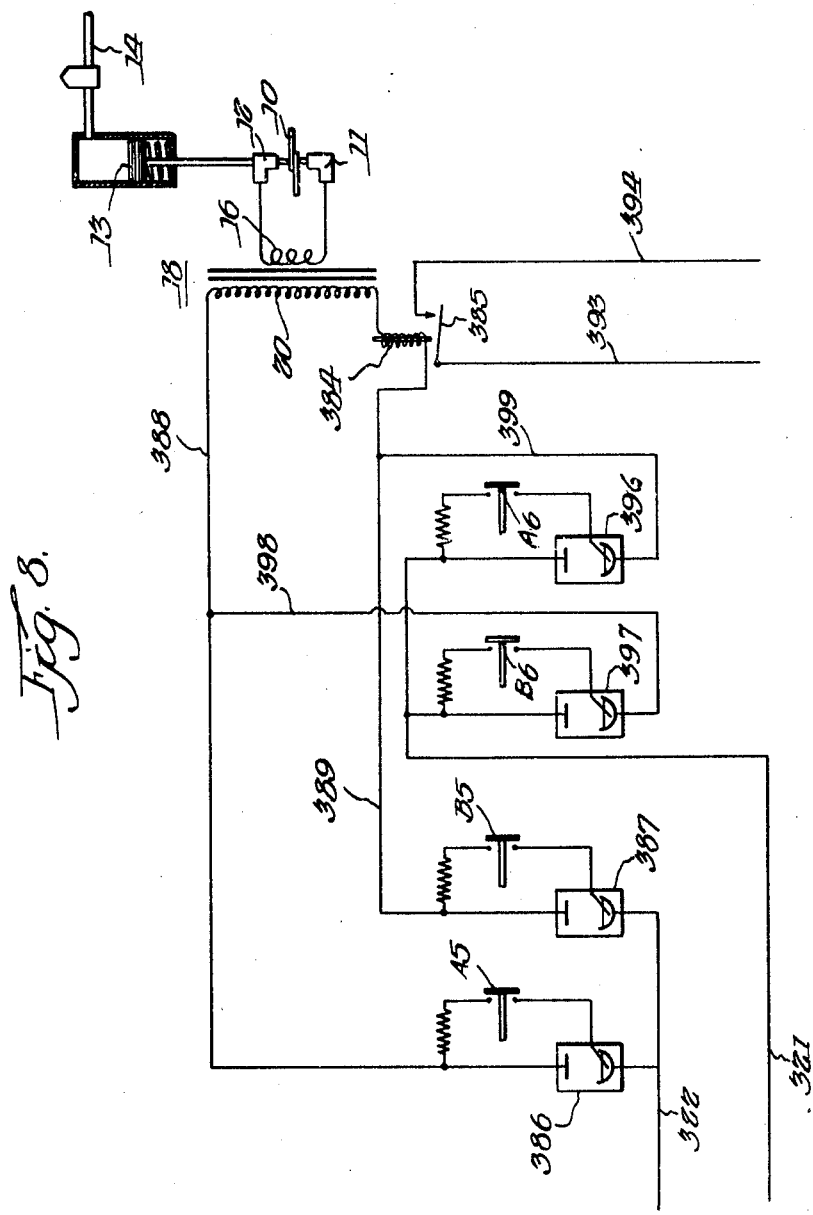

Patented July 5, 1949

2,474,867

UNITED STATES PATENT OFFICE

2,474,867

PROTECTIVE SYSTEM FOR THREE-PHASE SINGLE-PHASE MACHINES

David Sciaky, Chicago, Ill., assignor to Welding Research, Inc., Chicago, Ill., a corporation of Illinois Application December 20, 1945, Serial No. 636,239

8 Claims. (Cl. 323—58)

The invention relates to a method and apparatus for controlling the operations of electric discharge valves to prevent said valves from delivering current to an inductive load in the event a residual current, caused by a previous firing of the valves, is passing through the load.

The control system of the present invention has particular utility in connection with welding apparatus in which a single-phase welding current of low frequency is obtained from a source of polyphase current of higher frequency by deriving from said polyphase source uni-directional current impulses having a predetermined duration, in flowing said uni-directional current impulses through the primary of a welding transformer, and in reversing the direction of current flow for each of said impulses. Welding apparatus of this character is disclosed and claimed in my Patents Nos. 2,415,708 of February 11, 1947, and 2,431,083 of November 18, 1947.

An object of the invention resides in the provision of suitable means whereby the electric discharge valves to be fired for passing a current impulse are not allowed to become conductive until the current from the impulse immediately preceding and passing through the load has disappeared.

Another, and more specific object of the invention resides in the provision of a control system responsive to the current flowing in either the primary winding or secondary load circuit of the welding transformer for controlling the firing of the electric discharge valves.

A more specific object is to provide a protective system for use in conjunction with a timing and sequence control whereby said control will be prevented from firing the electric discharge valves of a rectifier to supply current to an inductive load unless the current from the previous firing has entirely disappeared.

Still another object is to provide means of preventing a short circuit from being established through the electric discharge valves of a rectifier and any similar valves in the primary circuit of a welding transformer by operating a control which prevents said rectifier from firing until all current through said electric discharge valves has disappeared, said current being in the opposite direction and caused by the last previous firing of the rectifier.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a diagrammatic view illustrating a three phase-single phase welding system embodying the improved protective control of the invention;

Figures 2 and 3 illustrate diagrammatically two ways in which the current may rise and fall in the primary winding of the welding transformer as a result of a firing of the rectifier;

Figure 4 illustrates diagrammatically the general form of the voltage across the secondary of the transformer identified by the numeral 60;

Figure 5 is a fragmentary wiring diagram showing a modified form of protective control within the scope of the invention;

Figure 6 is a fragmentary wiring diagram illustrating diagrammatically still another modification;

Figure 7 is a diagrammatic view illustrating another three phase-single phase welding system embodying a form of the improved protective control of the invention; and Figure 8 is a fragmentary wiring diagram showing a further modification of the three phase-single phase welding system illustrating diagrammatically an embodiment of the improved protective control of the invention.

Referring to the form of the invention shown in Figure 1, the workpieces 10 to be welded by a welding apparatus selected for illustrating the invention are placed between the stationary electrode 11 and the movable electrode 12. Pneumatic pressure is applied to piston 13 from the airline 14 through operation of valve 15, thereby causing the workpieces to be placed under mechanical pressure between electrodes 11 and 12 which are electrically connected to the secondary winding 16. Said winding and the connections to the electrodes comprise the secondary circuit of the welding transformer indicated in its entirety by 18. The primary winding 20 is electrically connected by means of conductors 21 and 22 to the secondary windings of a three-phase transformer. Electric discharge valves are interposed between each secondary winding and conductor 21 for the purpose of rectifying the alternating current of the power source and which is delivered to the primary winding 20 as impulses of direct current. The structure and operation of this transformer-type rectifier will now be described.

The source of current for the rectifier is identified by numeral 23, the same comprising the conventional three-phase alternating current supply having connection respectively with the primary windings, namely, 24, 25 and 26, of the power transformer. Each primary winding has a corresponding secondary winding identified by numerals 27, 28 and 29. The conductor 22 is electrically connected at 30 to a neutral point on the secondary windings and accordingly said conductor has connection with one terminal of each of the windings 27, 28 and 29. The other terminal of each secondary winding is electrically connected to conductor 21 through a pair of electric discharge valves connected in anti-parallel relation.

With respect to winding 27, the conductor 31 is electrically connected to the anode of the ignitron 32, the cathode of which connects through conductor 33 with conductor 21 leading to the primary winding 20. The ignitron 34, similar to 32, is connected in anti-parallel relation therewith since conductor 35 joins conductor 31 to the cathode of the ignitron, whereas, the anode of the same is electrically connected by conductor 36 to conductor 21. The secondary winding 28 is similarly connected to conductor 21 through ignitrons 37 and 39. The conductor 40 joins the outer terminal of winding 28 to the anode of the ignitron tube 37 with the cathode being connected by conductor 41 to conductor 21. The conductor 42 connects 40 with the cathode of ignitron tube 39, whereas, the anode of said tube is connected by conductor 43 to conductor 21. As regards secondary winding 29, a similar connection for the ignitron tubes 44 and 46 is provided. The conductor 47 joins the winding 29 to the anode of ignitron 44, with the cathode of said tube being connected by 48 to conductor 21. The conductor 49 electrically connects 47 with the cathode of tube 46, the anode of which tube is connected by conductor 50 to 21.

With a rectifier as described above it is possible to modify the wave-shape of the welding current since the voltage of the direct current impulses to the primary winding 20 may be varied. It will be understood that each ignitron tube includes an anode, a mercury cathode, and a firing pin. The circuit from the anode to the cathode through the tube is non-conducting until the mercury is vaporized, this being accomplished by the firing pin which extends into the tube, having contact with the mercury cathode. For closing the circuit through the firing pin of each ignitron tube a by-pass circuit for each tube is provided, the by-pass circuits including the thyratrons 51 for the ignitrons 32, 37 and 44, and the by-pass circuits including thyratrons 52 for the ignitrons 34, 39 and 46. The firing of the ignitrons through their respective firing pins is controlled by the thyratrons which are provided with a control grid having electrical connection with the timing sequence and control as indicated in Figure 1.

For the thyratrons 51 a conductor 53 electrically connects the control grid of the same to said timing sequence and control. In a similar manner the control grids of the thyratrons 52 are connected to the control by conductors 54. Conductors 55 electrically connect the conductor 21 with the timing sequence and control, and the same is likewise electrically connected by conductors 56 to each secondary winding, the circuit additionally including conductor 31 for winding 27, 45 for winding 28, and 47 for winding 29.

In operation of the transformer-type rectifier above described the ignitron tubes 32, 37 and 44 are fired as a group and which alternates with the firing of the ignitrons 34, 39 and 46. For firing the first group of ignitrons the grids of the thyratrons 51 are made positive while the grids of the thyratrons 52 are held negative. This is the function of the apparatus 58, identified as the timing sequence and control, and the same is merely indicated diagrammatically since the specific control employed is not material to a proper understanding of the present invention. For firing the second group of ignitrons the grids of the thyratrons 52 are made positive while the grids of thyratrons 51 are held negative. Once the ignitrons have been fired the ignitron tubes remain conducting until the potential on the grids of their control thyratrons is changed from positive to negative. Assuming that ignitron 32 has a positive half-wave voltage impressed upon it at the instant its control thyratron 51 is rendered conductive, then said tube will fire automatically. Exactly 120 degrees after the voltage first becomes positive on tube 32 a positive voltage will appear on the second ignitron 37. This causes the second ignitron to fire and presently the first ignitron is extinguished. In the same manner ignitron 44 is fired 120 degrees after ignitron 37 fires. Firing of ignitrons 34, 39 and 46 is similarly controlled by thyratrons 52 and their operation is the same, the only difference being that the negative half cycles of the voltage wave of the alternating current source is utilized for firing this second group of ignitrons. Therefore, the primary current impulse caused by firing of the second group of ignitrons is in a direction opposite to that produced by firing of the first set of ignitrons. By firing the ignitrons alternately, as regards groups, a series of uni-directional current impulses are caused to flow through the primary 20 of the welding transformer and which alternate first in one direction and then in a reverse direction. A form of alternating current is induced in the transformer secondary 16 which is a low frequency current, having a frequency of from 30 to less than 1 cycle per second, although it will be understood that a balanced load has been drawn from the multiple phase power supply of conventional 60 cycle frequency.

The invention provides a protective system whereby the group of ignitrons to be fired for supplying a current impulse to the primary winding 20 is not allowed to become conductive until the current passing through the load circuit from the previous impulse has entirely disappeared. The protective system as shown in Figure 1 may be replaced by the system of Figure 5, Figure 6, or Figure 7, and it is also possible to devise other systems having a similar mode of operation for accomplishing the same results.

The transformer 60, as shown in Figure 1, has a primary winding 61 which may be connected across winding 16 or winding 20 of the welding transformer 18. Said transformer 60 is part of a full-wave rectifier and includes a secondary winding 62 and conductors 63 and 64 connecting the terminals of winding 62 to the anodes of the thermionic tubes 65. Said tubes are diodes of either the gas or vacuum type having their cathodes joined by the conductor 66. A resistor 67 is electrically connected to a mid-point on winding 62 and to conductor 66. A condenser 68 is electrically connected in parallel relation across resistor 67. Said resistor and capacitor comprise a filter for the rectified current flowing through the resistor 67 from point A, which indicates the positive terminal, to point B, which indicates the negative terminal.

A conductor 70 is electrically connected to point A and a conductor 71 has adjustable connection with the resistor 67 at the negative terminal B. The conductors 70 and 71 lead to the timing sequence and control 58 and electrically connect with a thermionic tube or sensitive relay comprising part of said control so that the potential across the resistor is applied to the grid and cathode of said thermionic tube or the actuating coil of said relay. As a result said tube or relay functions in a manner whereby the timing sequence 58 prevents the group of ignitrons which are to fire next in turn from becoming conductive. As soon as the potential across resistor 67 disappears the timing control is allowed to continue its sequence of operations.

For explaining the operation of the protective system as shown in Figure 1 it will be assumed that ignitrons 32, 37 and 44 are conductive so that a uni-directional current is passing through the primary 20 of the welding transformer 18. Because of the inductive nature of the load, said current will rise exponentially, taking the form shown in Figures 2 and 3. In the event the ignitrons 32, 37 and 44 are rendered non-conductive at point D of Figures 2 and 3, at which time ignitron 44 happens to be conducting, then the ignitron will continue to pass current until the potential across said ignitron drops to the extinction value. The decay of current will thus take the form as indicated to the right of point D in Figure 2 or 3. While a uni-directional current impulse is flowing through the primary 20 a voltage will be generated across the secondary 16 and which is applied to the primary of transformer 60. Across the secondary of winding 62 there will be generated a voltage which will have the general form as shown in Figure 4. As long as a voltage is produced across the secondary 62 a potential will exist across the resistor 67, having the polarities as indicated, with A being the positive terminal and B the negative terminal. The resistor 67 and condenser 68 may be of such value as to allow the potential to be maintained across points A and B for any desired period of time, that is, the rate of discharge of condenser 68 will depend upon the size of the resistance of 67 and the capacity of 68. The voltage applied through conductors 70 and 71 to the grid of the control tube or to the relay coil in the timing sequence 58 may be the full potential across 67 or a part of the same for which purpose the negative terminal is made adjustable.

For some controls is may be necessary to apply the same voltage between grid and cathode of the control tube or to the relay coil in apparatus 58 for different rectifier output voltages. For the system of Figure 1 this can be accomplished by a proper choice of circuit elements and by making use of the saturation characteristic of the thermionic tubes 65. The voltage developed across points A and B will reach a maximum value which will be the same no matter what voltage is developed across the primary or secondary of transformer 20. In such a case it will not be necessary to compensate for different rectifier output voltages.

Referring to the modification shown in Figure 5, it will be understood that a rectifier is employed for delivering uni-directional current impulses through conductors 21 and 22 to the primary winding 20 of transformer 18. A suitable relay, indicated by 175, is electrically connected by conductors 176 and 177 across the primary winding 20, although the operation of this modified structure would be the same in the event the relay were connected across the secondary winding 16 in a manner similar to transformer 60, as shown in Figure 1. The armature 178 of the relay is electrically connected to the negative terminal of battery 180, which battery has its positive terminal connected by lead 170 to the timing sequence and control. Conductor 171 has connection with the armature 178. When the relay is energized, in which event the circuit through the battery 180 is closed, a negative potential will be applied to the grid of the control tube or to the actuating coil of a sensitive relay in the timing sequence and control 58.

In operation of the device shown in Figure 5 it will be understood that a uni-directional current impulse flowing through primary winding 20 will energize the relay 175. The armature 178 will be attracted to effect closing of the circuit through battery 180, thereby applying a negative potential to the grid of said control tube or to the relay coil as above described. As a result said tube or relay will function in a manner whereby the timing control prevents the group of ignitrons which are to fire next in turn from becoming conductive. When the current in the primary circuit has disappeared the relay 175 will become de-energized, allowing the armature 178 to open, thereby opening the battery circuit so that the grid of the control tube is no longer maintained negative or the coil of the relay is no longer energized. The timing sequence and control is accordingly allowed to continue its sequence of operations and the ignitron tubes next in turn are fired to cause another uni-directional current impulse to flow through the primary winding 20, whereupon the protective circuit again becomes operative as described.

In Figure 6 another modification is disclosed wherein numeral 181 represents a shunt in the primary circuit in series relation with primary winding 20. When current is flowing through said primary circuit a voltage will be generated across this shunt, which voltage is fed into the amplifier identified by numeral 182. The amplified voltage is then fed into a rectifier 183 and the output of the rectifier is supplied to the timing sequence and control through conductors 170 and 171. Conductor 170 has connection with the positive terminal on the output side of rectifier 183, whereas, conductor 171 has connection with the negative terminal so that a negative potential is applied to the grid of the control tube or the actuating coil of a sensitive relay in the timing sequence and control 58 in a manner similar to the systems as shown in Figures 1 and 5. When the flow of current through the primary circuit disappears a voltage will cease to exist across rectifier 181 and accordingly a potential will not be applied by the rectifier across conductors 170 and 171. The control tube or relay in the timing sequence and control 58 will allow the apparatus to function as intended and the next group of ignitron tubes will be fired to pass another uni-directional current impulse in the opposite direction through primary winding 20.

Figure 7 illustrates another form of the three phase-single phase welding apparatus embodying the improved protective control. In this diagram a single three phase half-wave rectifier supplies a direct current voltage which is applied to the primary of a welding transformer. A complete control sequence is shown with this system merely as a means of demonstrating a typical form of the action of the protective control. In this form of the apparatus the welding transformer 18, the pressure system and the rectifier transformer are all identical with the system shown in Figure 1. The source of current and all other factors pertaining to the main circuit of the rectifier are identical with Figure 1 with the exception that the outer terminals of each secondary winding is electrically connected to conductor 221 through only three electric discharge valves whose cathodes are all in parallel and connected to said conductor. With respect to winding 27, the conductor 231 is electrically connected to the anode of the ignitron 232, the cathode of which connects to conductor 221 leading to the center tap of the primary winding 20 through a minimum current relay 284. Secondary winding 28 is similarly connected to conductor 221 through ignitron 237. The conductor 240 joins the outer terminal of winding 28 to the anode of ignitron tube 237 with the cathode of said tube connected directly to conductor 221. As regards secondary winding 29, a similar connection for the ignitron tube 244 is provided. The conductor 247 joins the winding 29 to the anode of ignitron 244 with the cathode of said tube being connected directly to conductor 221.

For firing the ignitrons 232, 237 and 244 a by-pass circuit is provided between the firing pins or ignitrons and the anodes of said tubes which includes phanotrons 251, contactors A2, A3, A4, B2, B3 and B4, and resistors. The firing of the ignitrons through their respective firing pins is controlled by the phanotrons which fire automatically as soon as the relay contacts in series with them are closed.

Lead 222, connected to the center tap 30 of the secondary of the rectifier transformer, is also connected to the cathodes of ignitrons 286 and 287. Anode of ignitron 286 is connected to one side of the welding transformer primary 20 through conductor 288. Likewise, the anode of ignitron 287 is connected to the other side of the welding transformer primary 20 through conductor 289. Ignitrons 286 and 287 are controlled by ignitor circuits which include the contactor A5, in the case of ignitron 286, and contactor B5, in the case of ignitron 287. The center tap of the winding transformer primary 20 is connected to one side of a minimum current relay 284 through conductor 290. The other side of relay 284 is connected to the cathodes of the rectifier ignitrons through conductor 221.

The control circuit shown in this system is merely one means of causing the desired operation of the rectifier and welding apparatus. Any suitable control, either mechanical or electronic, could be used to provide the same operation. In order to demonstrate a typical action of the invention, the control system shown in Figure 7 will be described in detail in conjunction with the description of the complete sequence of operations of the apparatus and the function of the protective device.

For the control circuit an alternating current supply is obtained from leads L1 and L2, the circuit including the switch 103, fuses 104 and conductors 105 and 106. When the initiating switch 107 is closed, relay E becomes energized, causing the normally open contactors E1 and E2 to close.

A direct current voltage supply is obtained from rectifier 108, the primary of which is connected to the secondary of a constant voltage transformer 109 of which the primary has electrical connection across the leads 105 and 106. By closing contactor E1 a constant direct current voltage is impressed upon relay G, the current flowing through the normally closed contacto. G1 and the variable resistor 291. Relay G is not fully energized immediately because the rise in the current is delayed by the adjustable circuit including the variable resistor 291 and a condenser 292. Meanwhile, the closing of contactor E2 has caused relay A to become energized through the same and normally closed contactors G2, C1 and B1, with the result that the contactor A1 is opened and the contactors A2, A3, A4 and A5 are caused to close. As soon as contactors A2, A3 and A4 are closed, the phanotron 251, which has impressed across it a positive half-wave of voltage, will fire automatically, causing the ignitron to which it is connected also to fire. The next one will fire 120 degrees later and so on, all three firing 120 degrees apart in rapid succession. This causes a direct current voltage to be impressed upon conductors 221 and 222, causing ignitron 286, which is connected in such a sense that a positive voltage is impressed on its anode with respect to its cathode, to fire simultaneously with the firing of the ignitrons 232, 237 and 244, providing that contactor A5 actuated by relay A is closed. Accordingly, a current is caused to pass through conductor 222, ignitron 286, conductor 288, through one-half of the primary of transformer 18, through conductor 290, through minimum current relay 284 and through conductor 221 to the cathodes of the rectifier ignitrons. This induces a current in the primary and consequently in the secondary or welding circuit of the form shown in Figures 2 and 3.

After the current in the welding transformer primary has flowed for a period of time, determined by the characteristics of the variable resistor 291 and condenser 292, the relay G becomes fully energized, effecting actuation of the normally closed contactors G1 and G2 into an open position and the contactor G3 into a closed position. Opening of contactor G2 breaks the circuit to relay A, causing it to become immediately de-energized. The contactors A2, A3, A4 and A5 accordingly open so that all the affected ignitrons become non-conducting. Closing of contactor G3 energizes relay C, causing contactor C1 to open and contactor C2 to close, thereby preparing the circuit so that relay B instead of relay A will close for the next impulse of current supplied by the rectifier. Relay C is a lock-in relay which reverses its contacts each time it is energized and maintains them in a fixed position until re-energized. Assuming that contactor D2 is open, relay G becomes de-energized because its circuit has been broken by its own actuation which opened contact G1. This in turn recloses the contactors G1 and G2. The control circuit including resistor 291 and condenser 292 is again energized while the closing of contactor G2 effects the energization of relay B through contactors E2, C2 and A1. The relay A does not become energized at this time because contactors C1 and B1 are now open. With the energization of relay B contactors B2, B3 and B4 and B5 are caused to close and fire their respective ignitrons in the same manner that the ignitrons were fired by closing of relay A above.

This produces a primary impulse which flows through one-half of winding 20 in a direction opposite to the preceding impulse because ignitron 287 is now conducting instead of ignitron 286. After a predetermined time interval, relay C becomes fully energized to effect opening of contactors G1 and G2 and closing of contactor G3. This causes relay B to become de-energized, terminating the current impulse to the welding transformer by interrupting the firing of the ignitrons controlled thereby. After relay G has become de-energized the sequence is in exactly the same position as it was originally immediately after the initiating switch 107 was closed. As long as switch 107 remains closed the above sequence of events continues to be repeated in rapid succession, producing the desired alternating current in the secondary 16 of the welding transformer. When switch 107 is open relay E becomes de-energized, thereby causing contactors E1 and E2 to open. This causes the control circuit to become inoperative, stopping all further current impulses.

Relay 284 is so constructed that an extremely small current flowing through conductors 221 and 290 causes it to become energized, thereby closing its contact 285. Closing of contact 285 energizes relay D through conductors 293 and 294. This in turn causes contactors D1 and D2 to close. Minimum current relay 284 remains energized, causing contact 285 to remain closed as long as any current is flowing through the welding transformer primary 20 and conductors 221 and 290. As long as contact 285 is closed relay D remains energized, causing contactors D1 and D2 to remain closed. Contactor D2 maintains relay G in the energized position as long as relay D is energized. Contactor D1 maintains relay E in the energized condition as long as D is energized, regardless of whether or not switch 107 is opened. Therefore, a second or succeeding impulse of current can not be supplied by the rectifier to the welding transformer primary 20 until all current has disappeared from said primary circuit, causing relay 284 to become de-energized, which in turn causes relay D to become de-energized, opening contactors D1 and D2. As soon as this takes place relay G becomes de-energized and the next impulse is caused to be impressed upon the primary 20 of the welding transformer 18.

In Figure 8 four ignitrons are used instead of the two for reversing as in Figure 7. In this manner the whole of the primary 20 of the welding transformer 18 may be utilized for each impulse instead of only half. Conductor 322 is connected to the cathodes of ignitrons 386 and 387 which are actuated by relay contactors A5 and B5, respectively, in exactly the same manner as in Figure 7. The anode of ignitron 386 is connected to one side of the primary 20 of the welding transformer 18 through conductor 388. The anode of ignitron 387 is connected to the other side of the welding transformer primary 20 through conductor 389 and minimum current relay 384. Conductor 321 is connected to the anodes of two ignitrons 396 and 397 which are fired independently by the closing of contactors A6 and B6, respectively, said contactors being additional ones, actuated by the relays A and B in the control circuit of Figure 7. The cathode of ignitron 397 is connected to one side of welding transformer primary 20 through conductors 398 and 388. The cathode of ignitron 396 is connected to the other side of welding transformer primary 20 through conductors 399 and 389 and minimum current relay 384.

In operation the current impulses and control for the circuit shown in Figure 8 is identical with that shown in Figure 7 except that closing of relay A causes ignitrons 386 and 396 to fire simultaneously, these ignitrons being connected in series with the leads 321, 322 and welding transformer primary 20. Likewise, closing of relay B causes ignitrons 387 and 397 to fire in the same manner. Protection from firing the rectifier to give an impulse of current before all current has ceased to flow from the preceding impulse is given by the minimum current relay 384 in exactly the same manner as shown in Figure 7.

While only certain combinations of rectifier and reversing control have been shown with protective devices, it can be seen that any form of rectifier and reversing control causing successive impulses of current through the primary of the welding transformer to flow in opposite directions may be used with any of the protective methods shown in Figures 1, 5, 6, 7 and 8. Only slight modifications in the circuit are necessary to make any of the shown or similar protective devices operative with any of the shown firing systems or similar systems.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. For use in supplying uni-directional current impulses to a transformer from a source of alternating current, the combination comprising electric discharge valves connected in circuit with the source and said transformer, said valves being so arranged as to form two groups with each group having a valve for each phase of the alternating current source, timing and sequence control means for firing said valves alternately as regards groups, whereby uni-directional current impulses are supplied to said transformer, and a protective system including current actuated means responsive to current flowing in the transformer for preventing the said control means from firing the group of valves next in turn until the current of a previous impulse has disappeared.

2. For use in supplying uni-directional current impulses to a load circuit from a source of alternating current, the combination comprising electric discharge valves connected in circuit with the source and said circuit, said valves being so arranged as to form two groups with each group having a valve for each phase of the alternating current source, the valves for each phase being connected in anti-parallel relation whereby, one group is electrically connected to the load circuit to pass the positive half-cycles of said alternating current source as a uni-directional current in one direction, and the other group is electrically connected to the load circuit to pass the negative half-cycles of the alternating current source as a uni-directional current in the opposite direction, control means for firing the valves alternately as regards groups, and a protective system responsive to the current flowing in the load circuit for preventing the said control means from firing the group of valves next in turn until said current has disappeared.

3. In apparatus of the character described, the combination with a source of alternating current, of a rectifier electrically connected to said alternating current source on its input side, an inductive load circuit electrically connected to the output side of said rectifier, said rectifier including two groups of electric discharge valves with each group comprising a valve for each phase of the alternating current source, the valves for each phase being connected in anti-parallel relation, timing sequence and control means for firing said valves alternately as regards groups, whereby uni-directional current impulses are supplied to said inductive load circuit, and a protective system responsive to the current flowing in the load circuit for preventing the said control means from firing the group of valves next in turn until said current has disappeared, said protective system including means for applying a negative grid bias to a control tube in said control means during the period of current flow in said load circuit.

4. In apparatus of the character described, the combination with a source of alternating current, of a rectifier electrically connected to said alternating current source on its input side, a reactive load circuit electrically connected to the output side of said rectifier, said rectifier including two groups of electric discharge valves with each group comprising a valve for each phase of the alternating current source, timing sequence and control means for firing said valves alternately as regards groups, whereby uni-directional current impulses are supplied to said reactive load circuit, and a protective system responsive to the current flowing in the load circuit for preventing the said control means from firing the group of valves next in turn until said current has disappeared, said protective system including a circuit capable of developing a direct current potential across a resistor as a result of current flow in said load circuit, and means for applying said potential to a control tube in said control means.

5. In apparatus of the character described, the combination with a source of alternating current, of a rectifier electrically connected to said alternating current source on its input side, a welding transformer having a primary winding and a secondary load circuit, means electrically connecting said primary winding to the output side of the rectifier, said rectifier including two groups of electric discharge valves with each group comprising a valve for each phase of the alternating current source, said valves having connection to said primary winding and being so arranged whereby one group passes the positive half cycles of the alternating current source to the primary winding as a uni-directional current in one direction and whereby the other group passes the negative half cycles of the alternating current source to the primary winding as a unidirectional current in the opposite direction, timing sequence and control means for firing said valves alternately as regards groups, and a protective system for said control means including full-wave rectifying means responsive to current flowing in the secondary load circuit, a parallel circuit including a resistor and a condenser having electrical connection with said full-wave rectifying means whereby a potential is developed across the resistor during the period of current flow in the load circuit, and means for applying said potential to a control tube in said control means in a manner whereby said control means is prevented from firing the group of valves next in turn as long as said potential exists.

6. In apparatus of the character described, in combination, a source of alternating current, rectifier means electrically connected to said alternating-current source on its input side, an inductive load circuit electrically connected to the output side of said rectifier means, said rectifier means having operation to supply successive impulses of uni-directional current to the inductive load circuit, means for reversing the direction of current flow through the inductive load circuit on each impulse, and current responsive means for controlling the operations of said rectifier means whereby to prevent delivery of a current impulse to said load circuit until the current of a previous impulse has entirely disappeared.

7. In apparatus of the character described, in combination, a source of alternating current, a rectifier connected to said alternating current source on its input side, an inductive load circuit electrically connected to the output side of said rectifier, said rectifier including electric discharge valves each having an anode, a cathode and a control electrode, means for firing said valves through their control electrodes for predetermined periods of time and in succession to thereby supply impulses of uni-directional current to the inductive load circuit, means for reversing the direction of current flow through the inductive load circuit on each impulse, and current responsive means for controlling the firing of said discharge valves to prevent delivery of a current impulse to said load circuit until the current of a previous impulse has entirely disappeared.

8. Apparatus for the electric resistance welding of metals, in combination, a source of alternating current, a rectifier connected to said alternating-current source on its input side, an inductive load circuit electrically connected to the output side of said rectifier, said rectifier including electric discharge valves each having an anode, a cathode and a control electrode, means for firing said valves through their control electrodes for predetermined periods of time and in succession to thereby supply impulses of uni-directional current to the inductive load circuit, means for reversing the direction of current flow through the inductive load circuit on each impulse, said means including a timing sequence and control system having electrical association with the inductive load circuit, and said timing sequence and control system including means for preventing the firing of said discharge valves until the current flowing through the inductive load circuit from a previous firing has entirely disappeared.

DAVID SCIAKY.

REFERENCES CITED

The following references are of record in the file of this patent:

UNITED STATES PATENTS

| Number | Name | Date |
| --- | --- | --- |
| 2,120,565 | Lord et al. | June 14, 1938 |
| 2,276,796 | Rogers | Mar. 17, 1942 |
| 2,330,377 | Phair | Sept. 28, 1943 |
| 2,395,625 | Higgins | Feb. 26, 1946 |